United States Patent
Wang

(10) Patent No.: US 11,366,613 B2
(45) Date of Patent: Jun. 21, 2022

(54) METHOD AND APPARATUS FOR WRITING DATA

(71) Applicant: Beijing Baidu Netcom Science and Technology Co., Ltd., Beijing (CN)

(72) Inventor: Xinxing Wang, Beijing (CN)

(73) Assignee: Beijing Baidu Netcom Science and Technology Co., Ltd., Beijing (CN)

(*) Notice: Subject to any disclaimer, the term of this patent is extended or adjusted under 35 U.S.C. 154(b) by 0 days.

(21) Appl. No.: 16/895,322

(22) Filed: Jun. 8, 2020

(65) Prior Publication Data

US 2021/0117129 A1 Apr. 22, 2021

(30) Foreign Application Priority Data

Oct. 17, 2019 (CN) .......................... 201910987646.6

(51) Int. Cl.
*G06F 3/06* (2006.01)

(52) U.S. Cl.
CPC .......... *G06F 3/0659* (2013.01); *G06F 3/0604* (2013.01); *G06F 3/064* (2013.01); *G06F 3/0652* (2013.01); *G06F 3/0679* (2013.01)

(58) Field of Classification Search
CPC ...... G06F 3/0659; G06F 3/0604; G06F 3/064; G06F 3/0652; G06F 3/0679; G06F 3/0629; G06F 3/0676
See application file for complete search history.

(56) References Cited

U.S. PATENT DOCUMENTS

| | | | |
|---|---|---|---|
| 10,725,668 B1* | 7/2020 | Tang | G06F 3/0652 |
| 2014/0208007 A1* | 7/2014 | Cohen | G06F 12/0246 711/103 |
| 2016/0092120 A1* | 3/2016 | Liu | G06F 3/0688 711/103 |
| 2016/0283116 A1* | 9/2016 | Ramalingam | G06F 3/0611 |
| 2017/0097782 A1 | 4/2017 | Ramalingam | |
| 2018/0181323 A1* | 6/2018 | Li | G06F 3/0619 |
| 2018/0232181 A1* | 8/2018 | Zhou | G06F 3/0688 |
| 2018/0275911 A1* | 9/2018 | Nakazumi | G06F 3/0619 |

FOREIGN PATENT DOCUMENTS

| | | |
|---|---|---|
| CN | 101719099 A | 6/2010 |
| CN | 102750224 A | 10/2012 |
| CN | 109164975 A | 1/2019 |

* cited by examiner

*Primary Examiner* — Ramon A. Mercado
(74) *Attorney, Agent, or Firm* — The Webb Law Firm

(57) ABSTRACT

Embodiments of the present disclosure relate to a method and a device for writing data. The method may include: determining a target block for storing to-be-written data from a plurality of blocks divided in advance for a solid state disk in response to receiving a data write instruction, where the data write instruction includes information of the to-be-written data, and the solid state disk is divided into a plurality of blocks according to a band parameter; determining the to-be-written data based on the information of the to-be-written data; writing the to-be-written data into the target block using a single thread.

16 Claims, 4 Drawing Sheets

METHOD AND APPARATUS FOR WRITING DATA

CROSS-REFERENCE TO RELATED APPLICATION

This application claims priority to Chinese Application No. 201910987646.6 filed Oct. 17, 2019, the disclosure of which is hereby incorporated by reference in its entirety.

TECHNICAL FIELD

Embodiments of the present disclosure relate to the field of computer technology, and specifically to a method and apparatus for writing data.

BACKGROUND

Efficient and stable writing performance of an SSD (Solid State Disk, Solid State Disk) is an important content in a storage system design. Conventionally, a file system similar to an Ext4 (Fourth extended filesystem) is generally created on the SSD, a plurality of files are created, and a plurality of threads are used to perform concurrent writing for the files. After the files are written for a period of time, a lot of fragments are generated inside the SSD, and finally defragmentation is triggered, so that write amplification becomes high, write performance is sharply degraded, read/write delay is high, read/write performance of a product cannot be ensured, and user experience is affected.

SUMMARY

Embodiments of the present disclosure provide a method and apparatus for writing data.

In a first aspect, an embodiment of the present disclosure provides a method for writing data, the method including: determining, in response to receiving a data write instruction, a target block for storing to-be-written data from a plurality of blocks divided in advance for a solid state disk, the data write instruction including information of the to-be-written data, and the solid state disk being divided into the plurality of blocks according to a band parameter; determining the to-be-written data based on the information of the to-be-written data; and writing the to-be-written data into the target block using a single thread.

In some embodiments, the method further includes: marking a state of the target block according to a write rate of the target block.

In some embodiments, the determining the target block for storing data from the plurality of blocks divided in advance for the solid state disk includes: determining the target block from the plurality of blocks according to a state of each block.

In some embodiments, the determining the target block for storing data from the plurality of blocks divided in advance for the solid state disk includes: determining the target block from the plurality of blocks based on the information of the to-be-written data.

In some embodiments, the marking the state of the target block according to the write rate of the target block includes: marking the state of the target block as full in response to the target block being fully written; marking the state of the target block as available in response to the target block not being fully written.

In some embodiments, the method further includes: after dividing the solid state disk into the plurality of blocks, marking states of the obtained plurality of blocks as idle; or in response to the data in the block being deleted, marking the state of the block of the deleted data as idle.

In some embodiments, the determining the target block from the plurality of blocks according to the state of each block includes: in response to a block being in an available state currently, using the block in the available state as the target block; in response to no block being in the available state currently, selecting a block from blocks in an idle state as the target block.

In some embodiments, the method further includes: determining a new target block from the plurality of blocks in response to the target block being fully written and the to-be-written data not being written completely, and writing unwritten data into the new target block.

In a second aspect, an embodiment of the present disclosure further provides an apparatus for pushing information, the apparatus including: a target block selecting unit configured to determine, in response to receiving a data writing instruction, a target block for storing to-be-written data from a plurality of blocks divided in advance for a solid state disk, the data writing instruction including information of the to-be-written data, and the solid state disk being divided into the plurality of blocks according to a band parameter; a data determining unit configured to determine to-be-written data based on the information of the to-be-written data; and a data writing unit configured to write the to-be-written data into the target block using a single thread.

In some embodiments, the apparatus further includes: a first state marking unit configured to mark a state of the target block according to a write rate of the target block.

In some embodiments, the target block selection unit is further configured to: determine the target block from the plurality of blocks according to a state of each block.

In some embodiments, the target block selection unit is further configured to: determine the target block from the plurality of blocks based on the information of the to-be-written data.

In some embodiments, the first state marking unit is further configured to: mark the state of the target block as full in response to the target block being fully written; mark the state of the target block as available in response to the target block not being fully written.

In some embodiments, the apparatus further includes a second state marking unit configured to: after dividing the solid state disk into the plurality of blocks, mark states of the obtained plurality of blocks as idle; or in response to the data in the block being deleted, mark the state of the block of the deleted data as idle.

In some embodiments, the first state marking unit is further configured to: in response to a block being in an available state currently, use the block in the available state as the target block; in response to no block being in the available state currently, select a block from blocks in an idle state as the target block.

In some embodiments, the apparatus further includes a re-selecting unit configured to determine a new target block from the plurality of blocks in response to the target block being fully written and the to-be-written data not being written completely, and write unwritten data into the new target block.

In a third aspect, an embodiment of the present disclosure further provides an electronic device, the electronic device including one or more processors; and a storage apparatus, storing one or more programs, the one or more programs, when executed by the one or more processors, cause the one or more processors to implement the method according to any embodiment according to the first aspect.

In a fourth aspect, an embodiment of the present disclosure further provides a computer readable medium, storing a computer program thereon, the computer program, when executed by a processor, causes the processor to implement the method according to any embodiment according to the first aspect.

According to the method and apparatus for writing data provided in embodiments of the present disclosure, upon receiving a data writing instruction, a target block for storing data can be determined from a plurality of blocks divided in advance for a solid state disk. The data write instruction may include information of to-be-written data, and the solid state disk is divided into the plurality of blocks according to a band parameter. Then, the to-be-written data is determined based on the information of the to-be-written data. The to-be-written data is then written into the target block using a single thread. Finally, the state of the target block is marked according to the writing rate of the target block. According to the method of the present embodiment, the solid state disk is divided, and single-thread writing is used, so that generation of a disk fragment can be reduced, thereby improving writing efficiency.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

Embodiments of present disclosure will be described below in detail with reference to the accompanying drawings. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that some embodiments in the present disclosure and some features in the disclosure may be combined with each other on a non-conflict basis. Features of the present disclosure will be described below in detail with reference to the accompanying drawings and in combination with embodiments.

Figure 1:
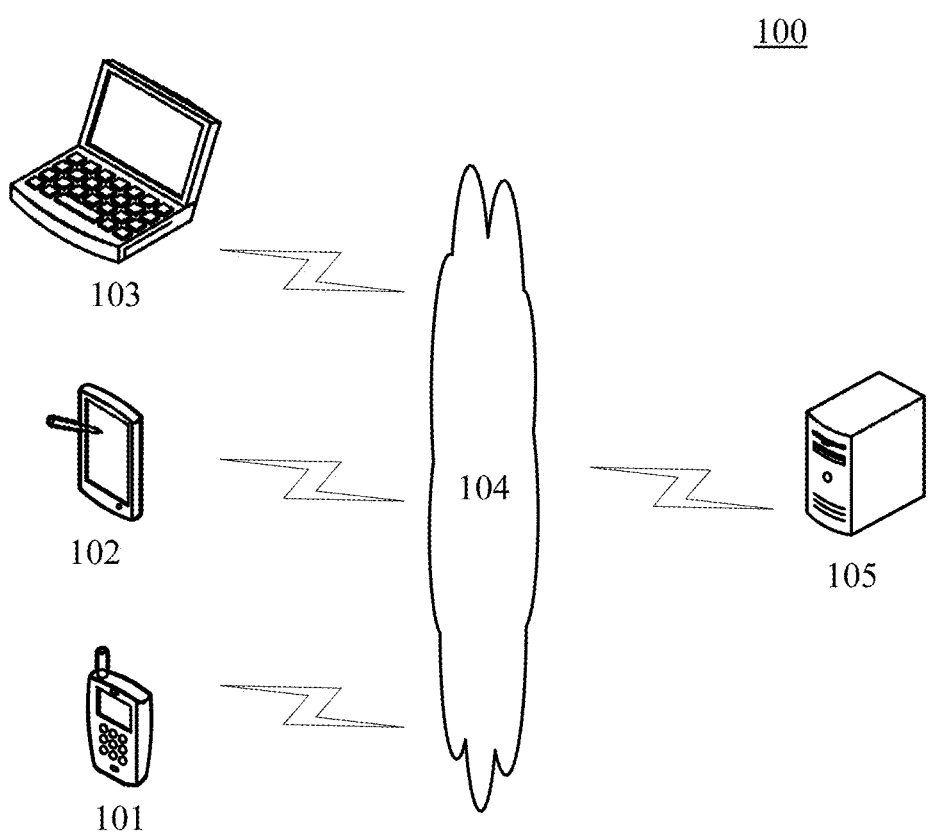
FIG. 1 is a diagram of an example system architecture in which embodiments of the present disclosure may be implemented.

FIG. 1 illustrates an example system architecture 100 in which a method for writing data or an apparatus for writing data of embodiments of the present disclosure may be implemented.

As shown in FIG. 1, the system architecture 100 may include terminal devices 101, 102, 103, a network 104, and a server 105. The network 104 serves as a medium for providing a communication link between the terminal devices 101, 102, 103 and the server 105. The network 104 may include various types of connections, such as wired or wireless communication links, or optical fiber cables, among others.

The user may interact with the server 105 through the network 104 using the terminal devices 101, 102, 103 to receive or send messages, etc. Various communication client applications such as a web browser application, a shopping application, a search application, an instant messaging tool, a mailbox client, social platform software, or the like may be installed on the terminal devices 101, 102, 103.

The terminal devices 101, 102, 103 may be hardware or software. When the terminal devices 101, 102, 103 are hardware, the terminal devices 101, 102, 103 may be various electronic devices having a display screen, including but not limited to a smartphone, a tablet computer, an electronic book reader, a laptop computer, a desktop computer, or the like. When the terminal devices 101, 102, and 103 are software, he terminal devices 101, 102, 103 may be installed in the electronic devices listed above. It may be implemented as a plurality of software programs or software modules (e.g., for providing distributed services) or as a single software program or software module. It is not specifically limited herein.

The server 105 may be a server providing various services, such as a backend storage server providing support for data to be stored by the terminal devices 101, 102, 103. The backend storage server may analyze the received data storage instruction and the like, and store the data to be stored in the solid state disk.

It should be noted that the server may be hardware or software. When the server is hardware, the server may be implemented as a distributed server cluster of a plurality of servers, or the server may be implemented as a single server. When the server is software, the server may be implemented as a plurality of software programs or software modules (e.g., for providing distributed services), or the server may be implemented as a single software program or software module. It is not specifically limited herein.

It should be noted that the method for writing data provided in embodiments of the present disclosure may be executed by the terminal devices 101, 102, and 103, or may be executed by the server 105. Accordingly, the apparatus for writing data may be provided in the terminal devices 101, 102, 103, or may be provided in the server 105.

It should be understood that the number of terminal devices, networks and servers in FIG. 1 is merely illustrative. Any number of terminal devices, networks, and servers may be provided based on actual requirements.

Figure 2:
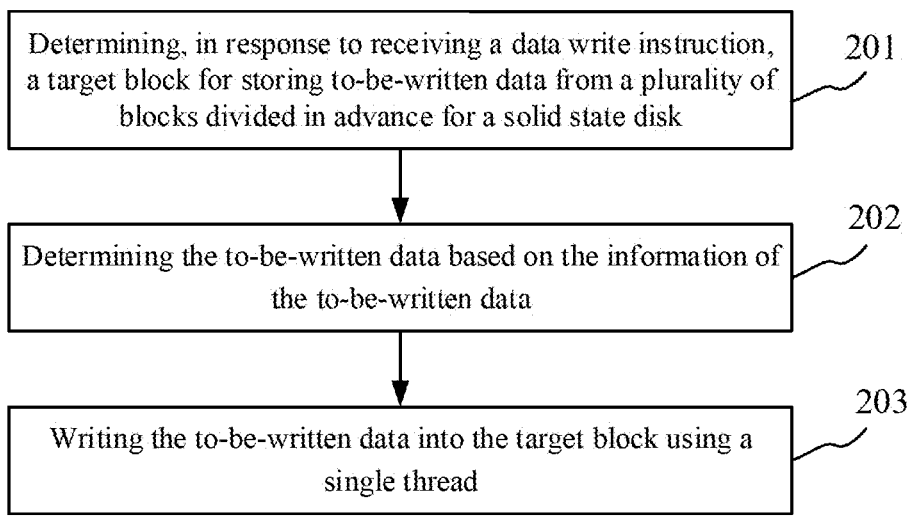
FIG. 2 is a flowchart of a method for writing data according to an embodiment of the present disclosure.

With further reference to FIG. 2, a flow 200 of a method for writing data according to an embodiment of the present disclosure is shown. The method for writing data according to the present embodiment includes the following steps.

Step 201, determining, in response to receiving a data write instruction, a target block for storing to-be-written data from a plurality of blocks divided in advance for a solid state disk.

In the present embodiment, an execution body of the method for writing data, such as the terminal devices 101, 102, 103 or the server 105 shown in FIG. 1, may receive a data writing instruction. The data write instruction may be sent by a user, or may be sent by another electronic device. The data write instruction may include information of to-bewritten data, and the information of to-be-written data may include a storage address, a size, a type, and the like. The plurality of blocks divided for the solid state disk may be divided according to band parameters. The skilled person can know the size of the band by querying the product manual of the SSD, and then divide the solid-state hard disk into a plurality of blocks according to the value of the band. In some scenarios, the solid state disk may also be divided into blocks based on an integer multiple of the band value. After division, the size of each block may be the same or different. For example, some blocks have the same size as the size of the band, and some blocks have a size that is twice the size of the band.

The execution body may determine a target block for storing to-be-written data from the plurality of blocks. Specifically, the execution body may select the target block according to the size of the to-be-written data. Alternatively, the execution body may select the target block according to the type of the to-be-written data.

In some alternative implementations of the present embodiment, the execution body may determine the target block from the plurality of blocks according to the information of the to-be-written data. The above information may include a size, a type, and the like.

In some alternative implementations of the present embodiment, the execution body may determine the target block from the plurality of blocks based on a state of each block.

In this implementation, the state of the block may include full, idle, and available. The full state indicates that the block is full of data and cannot be written again. The idle state indicates that no data is stored in the block and can be used to store the data. The available state indicates that a portion of data has been stored in the block, but there is still free space to store data. In some application scenarios, the execution body may select a block in an available state as a target block to avoid generation of fragments.

Step 202, determining the to-be-written data based on the information of the to-be-written data.

After receiving the data write instruction, the execution body may determine the to-be-written data according to the information of the to-be-written data included in the data write instruction. Specifically, the execution body may acquire the to-be-written data according to the address of the to-be-written data included in the data write instruction.

Step 203, writing the to-be-written data into the target block using a single thread.

After determining the to-be-written data and the target block, the execution body may write the to-be-written data into the target block using a single thread. In the existing solutions, a plurality of threads are used to store data. When each thread is stored, a storage address is often randomly selected, resulting in an increase in fragments. In this embodiment, the single thread is used to store the to-be-written data in the target block, thereby reducing the write amplification in the storage process and avoiding the generation of fragments, thereby improving the storage efficiency. In some implementation scenarios, the execution body may employ a fixed thread for writing data to each block of the solid state disk.

In some alternative implementations of the present embodiment, the above method may further include the following step not shown in FIG. 2: marking a state of the target block according to a write rate of the target block.

In this implementation, the execution body may calculate the write rate of the target block. Specifically, the execution body may use the ratio of the size of the data stored in the target block to the size of the target block in the writing process as the write rate of the target block. Then, based on the write rate of the target block, it is determined whether or not the target block is fully written to mark the state of the target block. For example, if the write rate of the target block is 100%, the target block is fully written, and the state of the target block is marked as full. If the write rate of the target block is less than 100%, the target block is not fully written, and the state of the target block is marked as available.

In some alternative implementations of the present embodiment, the execution body may mark the state of the target block as full after determining that the target block is fully written. When it is determined that the target block is not fully written, the state of the target block may be marked as available.

In some alternative implementations of the present embodiment, after the solid state disk is divided into a plurality of blocks, the execution body may mark the states of the respective blocks as idle. Alternatively, after the data in the block is deleted, the state of the block is marked as idle.

In this embodiment, the execution body may indicate that the block is not written with data by marking the state of the block as idle, and may select from blocks in the idle state when selecting the target block.

In some alternative implementations of the present embodiment, the execution body may determine the target block from the plurality of blocks based on the state of each block.

In this implementation, the state of the block may include full, idle, and available. The full state indicates that the block is full of data and cannot be written again. The idle state indicates that no data is stored in the block and can be used to store the data. The available state indicates that a portion of data has been stored in the block, but there is still free space to store data. In some application scenarios, the execution body may select a block in an available state as a target block to avoid generation of fragments.

In some alternative implementations of the present embodiment, when determining the target block, the execution body may first determine whether a block in the available state currently exists, and if the block in the available state currently exists, use the block in the available state as the target block. If the block in the available state does not currently exist, a block may be selected from the blocks in the idle state as the target block.

Figure 3:
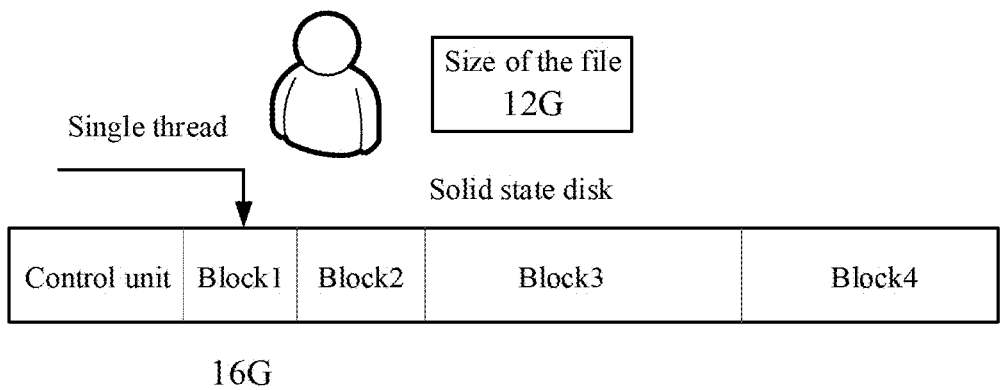
FIG. 3 is a schematic diagram of an application scenario of a method for writing data according to the present disclosure.

With further reference to FIG. 3, FIG. 3 is a schematic diagram of an application scenario of a method for writing data according to the present embodiment. In the application scenario of FIG. 3, the user stores a file having a size of 12G to the solid state disk. A control unit in the solid state disk selects a block 1 having a size of 16G from a plurality of blocks divided in advance as a target block according to the size of the file to store the file. The file is then written into the target block using a single thread.

According to the method for writing data provided in embodiments of the present disclosure, a single thread is used to store to-be-written data into a target block, thereby reducing the write amplification in the storage process and avoiding generation of fragments, thereby improving storage efficiency.

Figure 4:
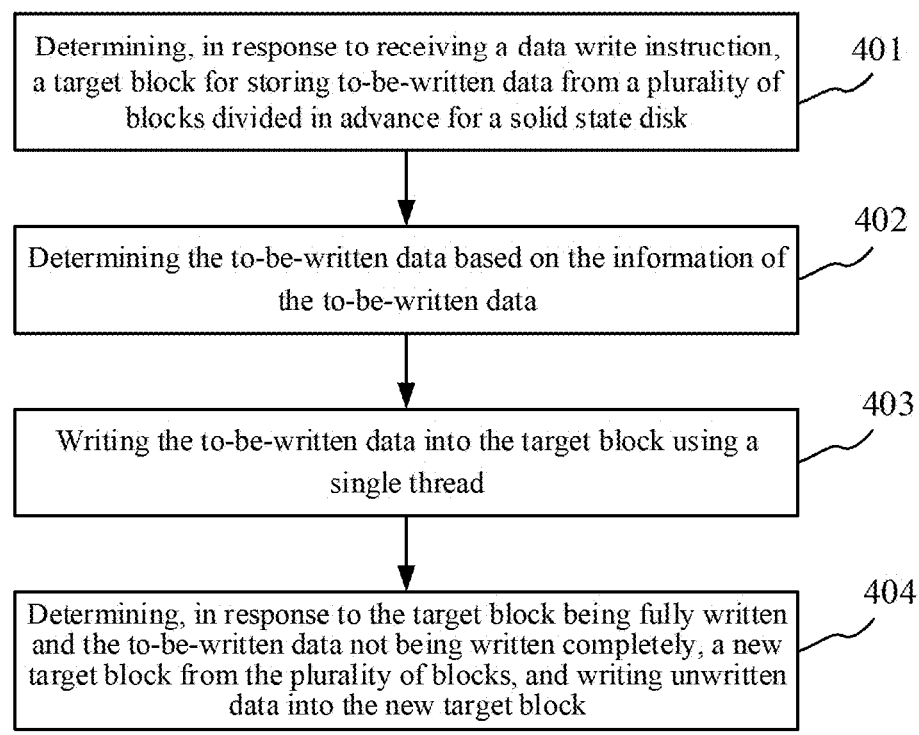
FIG. 4 is a flowchart of a method for writing data according to another embodiment of the present disclosure.

With further reference to FIG. 4, a flow diagram 400 of a method for writing data according to another embodiment of the present disclosure is shown. As shown in FIG. 4, the method for writing data in the present embodiment may include the following steps.

Step 401, determining, in response to receiving a data write instruction, a target block for storing to-be-written data from a plurality of blocks divided in advance for a solid state disk.

Step 402, determining the to-be-written data according to the information of the to-be-written data.

Step 403, writing the to-be-written data into the target block using a single thread.

The principle of step 401403 is similar to that of step 201203, and details are not described herein.

Step 404, determining, in response to the target block being fully written and the to-be-written data not being written completely, a new target block from the plurality of blocks, and writing unwritten data into the new target block.

In the present embodiment, if the target block is fully written, but the to-be-written data is not yet written completely, the execution body may determine a new target block from the plurality of blocks. That is, one of the blocks in the idle state is selected as the new target block. Then, unwritten data is written into the new target block.

According to the method for writing data provided in embodiments of the present disclosure, by sequentially writing data to each data block by using a single thread, generation of fragments can be avoided, and times of defragmentation can be reduced, so that writing efficiency can be improved.

Figure 5:
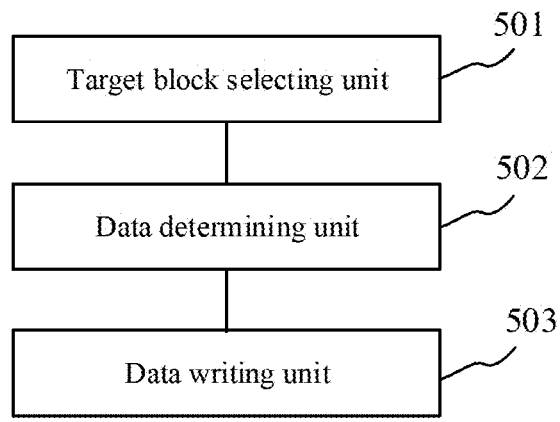
FIG. 5 is a schematic structural diagram of an apparatus for writing data according to an embodiment of the present disclosure.

With further reference to FIG. 5, as an implementation of the method shown in each of the above figures, an embodiment of the present disclosure provides an apparatus for writing data. An embodiment of the apparatus may correspond to an embodiment of the method shown in FIG. 2. The apparatus may be specifically applied to various electronic devices.

As shown in FIG. 5, the apparatus 500 for writing data in the present embodiment includes a target block selecting unit 501, a data determining unit 502, and a data writing unit 503.

The target block selecting unit 501 is configured to determine a target block for storing to-be-written data from a plurality of blocks divided in advance for the solid state disk in response to receiving a data writing instruction. The data write instruction includes information of to-be-written data, and the solid state disk is divided into the plurality of blocks according to a band parameter.

The data determining unit 502 is configured to determine the to-be-written data according to the information of the to-be-written data.

The data writing unit 503 is configured to write to-be-written data into the target block using a single thread.

In some alternative implementations of the present embodiment, the apparatus 500 may further include a first state marking unit not shown in FIG. 5, configured to mark a state of the target block according to a write rate of the target block.

In some alternative implementations of the present embodiment, the target block selection unit 501 is further configured to determine the target block from the plurality of blocks according to a state of each block.

In some alternative implementations of the present embodiment, the target block selection unit 501 is further configured to determine the target block from the plurality of blocks according to a state of each block.

In some alternative implementations of the present embodiment, the first state marking unit is further configured to mark the state of the target block as full in response to the target block being fully written; mark the state of the target block as available in response to the target block not being fully written.

In some alternative implementations of the present embodiment, the apparatus 500 may further include a second state marking unit not shown in FIG. 5, configured to mark states of the obtained plurality of blocks as idle after dividing the solid state disk into the plurality of blocks; or in response to the data in the block being deleted, mark the state of the block of the deleted data as idle.

In some alternative implementations of the present embodiment, the first state marking unit is further configured to in response to a block being in an available state currently, use the block in the available state as the target block; in response to no block being in the available state currently, select a block from blocks in an idle state as the target block.

In some alternative implementations of the present embodiment, the apparatus 500 may further include a re-selection unit, not shown in FIG. 5, configured to determine a new target block from the plurality of blocks in response to the target block being fully written and the to-be-written data not being written completely, and write unwritten data into the new target block.

It should be understood that the units 501 to 503 described in the apparatus 500 for writing data correspond to the respective steps in the method described with reference to FIG. 2, respectively. Thus, the operations and features described above with respect to the method for writing data are equally applicable to the apparatus 500 and the units contained therein, and are not described herein again.

Figure 6:
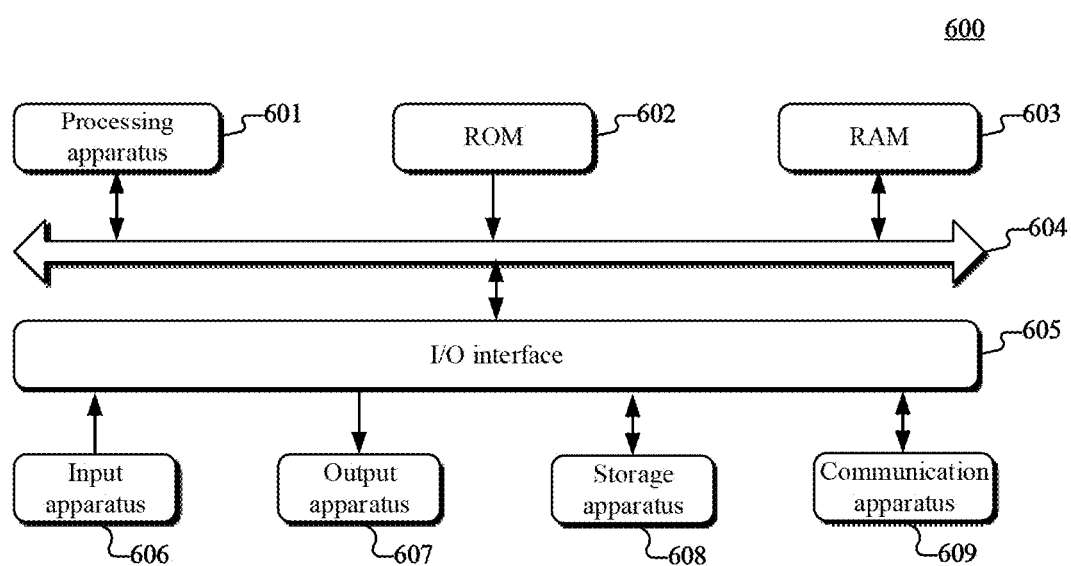
FIG. 6 is a schematic structural diagram of a computer system adapted to implement an electronic device according to an embodiment of the present disclosure.

Referring now to FIG. 6, a schematic structural diagram adapted to implement an electronic device 600 (e.g., a server or a terminal device in FIG. 1) of some embodiments of the present disclosure is shown. The electronic device shown in FIG. 6 is merely an example and should not be construed as limiting the functionality and scope of use of embodiments of the present disclosure.

As shown in FIG. 6, the electronic device 600 may include a processing apparatus (e.g., a central processing unit, a graphics processor, or the like) 601, which may perform various appropriate actions and processes according to a program stored in a read-only memory (ROM) 602 or a program loaded from a storage apparatus 608 into a random access memory (RAM) 603. In RAM 603, various programs and data required for operation of the electronic device 600 are also stored. The processing apparatus 601, ROM 602 and RAM 603 are connected to each other via a bus 604. An input/output (I/O) interface 605 is also connected to bus 604.

Generally, the following apparatuses may be connected to the I/O interface 605: an input apparatus 606 including, for example, a touch screen, a touchpad, a keyboard, a mouse, a camera, a microphone, an accelerometer, a gyroscope, and the like; an output apparatus 607 including, for example, a liquid crystal display (LCD), a speaker, a vibrator, or the like; a storage apparatus 608 including, for example, a magnetic tape, a hard disk, and the like; and a communication apparatus 609. The communication apparatus 609 may allow the electronic device 600 to exchange data with other devices through wireless or wired communication. While FIG. 6 shows the electronic device 600 having various apparatuses, it should be understood that it is not necessary to implement or provide all of the apparatuses shown in the figure. More or fewer apparatuses may be alternatively implemented or provided. Each block shown in FIG. 7 may represent an apparatus, or represent a plurality of apparatuses as required.

In particular, according to some embodiments of the present disclosure, the process described above with reference to the flow chart may be implemented in a computer software program. For example, some embodiments of the present disclosure include a computer program product, which includes a computer program that is tangibly embedded in a computer readable medium. The computer program includes program codes for executing the method as shown in the flow chart. In such an embodiment, the computer program may be downloaded and installed from the network through the communication apparatus 609, or installed from the storage apparatus 608, or installed from the ROM 602. When the computer program is executed by the processing apparatus 601, the above functions defined in the method of the embodiment of the present disclosure are performed. It should be noted that the computer readable medium according to some embodiments of the present disclosure may be a computer readable signal medium or a computer readable medium or any combination of the above two. An example of the computer readable medium may include, but is not limited to: electric, magnetic, optical, electromagnetic, infrared, or semiconductor systems, apparatuses, elements, or a combination of any of the above. A more specific example of the computer readable medium may include, but is not limited to: electrical connection with one or more pieces of wire, a portable computer disk, a hard disk, a random access memory (RAM), a read only memory (ROM), an erasable programmable read only memory (EPROM or flash memory), an optical fiber, a portable compact disk read only memory (CD-ROM), an optical memory, a magnetic memory, or any suitable combination of the above. In some embodiments of the present disclosure, the computer readable medium may be any tangible medium containing or storing programs, which may be used by, or used in combination with, a command execution system, apparatus or element. In some embodiments of the present disclosure, the computer readable signal medium may include a data signal in the base band or propagating as a part of a carrier wave, in which computer readable program codes are carried. The propagating data signal may take various forms, including but not limited to an electromagnetic signal, an optical signal, or any suitable combination of the above. The computer readable signal medium may also be any computer readable medium except for the computer readable medium. The computer readable medium is capable of transmitting, propagating or transferring programs for use by, or used in combination with, a command execution system, apparatus or element. The program codes contained on the computer readable medium may be transmitted with any suitable medium, including but not limited to: wireless, wired, optical cable, RF medium, etc., or any suitable combination of the above.

The computer readable medium may be included in the above electronic device; or a stand-alone computer readable medium without being assembled into the electronic device. The computer readable medium stores one or more programs. The one or more programs, when executed by the electronic device, cause the electronic device to: determine, in response to receiving a data write instruction, a target block for storing to-be-written data from a plurality of blocks divided in advance for the solid state disk, where the data writing instruction includes information of to-be-written data, and the solid state disk is divided into a plurality of blocks according to the band parameters; determining to-be-written data based on the information of the to-be-written data; and writing the to-be-written data into the target block using a single thread.

A computer program code for executing operations in some embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In a circumstance involving a remote computer, the remote computer may be connected to a user's computer through any network, including local area network (LAN) or wide area network (WAN), or be connected to an external computer (for example, connected through the Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logical functions. It should be further noted that, in some alternative implementations, the functions denoted by the blocks may also occur in a sequence different from the sequences shown in the figures. For example, any two blocks presented in succession may be executed substantially in parallel, or they may sometimes be executed in a reverse sequence, depending on the functions involved. It should be further noted that each block in the block diagrams and/or flow charts as well as a combination of blocks in the block diagrams and/or flow charts may be implemented using a dedicated hardware-based system executing specified functions or operations, or by a combination of dedicated hardware and computer instructions.

The units involved in some embodiments of the present disclosure may be implemented by software, or may be implemented by hardware. The described units may also be provided in a processor, for example, described as: a processor including a target block selecting unit, a data determining unit and a data writing unit. The names of the units do not constitute a limitation to such units themselves in some cases. For example, the data writing unit may be further described as "a unit configured to write the to-be-written data into the target block using a single thread."

The above description only provides an explanation of embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in the present disclosure are examples.

What is claimed is:

1. A method for writing data, comprising:
determining, in response to receiving a data write instruction, a target block for storing to-be-written data from a plurality of blocks divided in advance for a solid state disk, the data write instruction comprising information of the to-be-written data, and the solid state disk being divided into the plurality of blocks according to a band parameter, wherein the blocks divided in advance have different sizes, the data write instruction comprises a size of the to-be-written data, and determining the target block for storing the to-be-written data from the plurality of blocks comprises: determining the target block having a target size from the plurality of blocks based on the size of the to-be-written data;
determining the to-be-written data based on the information of the to-be-written data;
writing the to-be-written data into the target block using a single thread; and
marking a state of the target block according to a write rate of the target block, wherein the write rate of the target block is a ratio of size of data stored in the target block to size of the target block.

2. The method according to claim 1, wherein the determining the target block for storing data from the plurality of blocks divided in advance for the solid state disk comprises:
determining the target block from the plurality of blocks according to a state of each block.

3. The method according to claim 1, wherein the determining the target block for storing data from the plurality of blocks divided in advance for the solid state disk comprises:
determining the target block from the plurality of blocks based on the information of the to-be-written data.

4. The method according to claim 1, wherein the marking the state of the target block according to the write rate of the target block comprises:
marking the state of the target block as full in response to the target block being fully written;
marking the state of the target block as available in response to the target block not being fully written.

5. The method according to claim 1, further comprising:
after dividing the solid state disk into the plurality of blocks, marking states of the obtained plurality of blocks as idle; or
in response to the data in the block being deleted, marking the state of the block of the deleted data as idle.

6. The method according to claim 2, wherein the determining the target block from the plurality of blocks according to the state of each block comprises:
in response to a block being in an available state currently, using the block in the available state as the target block;
in response to no block being in the available state currently, selecting a block from blocks in an idle state as the target block.

7. The method according to claim 1, further comprising:
determining a new target block from the plurality of blocks in response to the target block being fully written and the to-be-written data not being written completely, and writing unwritten data into the new target block.

8. An apparatus for writing data, comprising:
at least one processor; and
a memory storing instructions, the instructions when executed by the at least one processor, causing the at least one processor to perform operations, the operations comprising:
determining, in response to receiving a data writing instruction, a target block for storing to-be-written data from a plurality of blocks divided in advance for a solid state disk, the data writing instruction comprising information of the to-be-written data, and the solid state disk being divided into the plurality of blocks according to a band parameter, wherein the blocks divided in advance have different sizes, the data write instruction comprises a size of the to-be-written data, and determining the target block for storing the to-be-written data from the plurality of blocks comprises: determining the target block having a target size from the plurality of blocks based on the size of the to-be-written data;
determining the to-be-written data based on the information of the to-be-written data;
writing the to-be-written data into the target block using a single thread; and
marking a state of the target block according to a write rate of the target block, wherein the write rate of the target block is a ratio of size of data stored in the target block to size of the target block.

9. The apparatus according to claim 8, wherein the determining the target block for storing data from the plurality of blocks divided in advance for the solid state disk comprises:
determining the target block from the plurality of blocks according to a state of each block.

10. The apparatus according to claim 8, wherein the determining the target block for storing data from the plurality of blocks divided in advance for the solid state disk comprises:
determining the target block from the plurality of blocks based on the information of the to-be-written data.

11. The apparatus according to claim 8, wherein the marking the state of the target block according to the write rate of the target block comprises:
marking the state of the target block as full in response to the target block being fully written;
marking the state of the target block as available in response to the target block not being fully written.

12. The apparatus according to claim 8, the operations further comprising:
after dividing the solid state disk into the plurality of blocks, marking states of the obtained plurality of blocks as idle; or
in response to the data in the block being deleted, marking the state of the block of the deleted data as idle.

13. The apparatus according to claim 10, wherein the determining the target block from the plurality of blocks according to the state of each block comprises:
in response to a block being in an available state currently, using the block in the available state as the target block;
in response to no block being in the available state currently, selecting a block from blocks in an idle state as the target block.

14. The apparatus according to claim 8, the operations further comprising:
determining a new target block from the plurality of blocks in response to the target block being fully written and the to-be-written data not being written completely, and writing unwritten data into the new target block.

15. A solid state disk, storing a computer program thereon, the computer program, when executed by a processor, causes the processor to perform operations, the operations comprising:

determining, in response to receiving a data writing instruction, a target block for storing to-be-written data from a plurality of blocks divided in advance for a solid state disk, the data writing instruction comprising information of the to-be-written data, and the solid state disk being divided into the plurality of blocks according to a band parameter, wherein the blocks divided in advance have different sizes, the data write instruction comprises a size of the to-be-written data, and determining the target block for storing the to-be-written data from the plurality of blocks comprises: determining the target block having a target size from the plurality of blocks based on the size of the to-be-written data;

determining the to-be-written data based on the information of the to-be-written data;

writing the to-be-written data into the target block using a single thread; and marking a state of the target block according to a write rate of the target block, wherein the write rate of the target block is a ratio of size of data stored in the target block to size of the target block.

16. The method according to claim 1, wherein determining the target block having the target size from the plurality of blocks based on the size of the to-be-written data comprises: determining, from the plurality of blocks, a block having a size closest to the size of the to-be-written data as the target block having the target size.

* * * * *